US006974099B2

(12) United States Patent
Kolar et al.

(10) Patent No.: US 6,974,099 B2
(45) Date of Patent: Dec. 13, 2005

(54) BLENDER BLADE

(75) Inventors: David J. Kolar, Stow, OH (US); Richard D. Boozer, Wakeman, OH (US); Michael D. Anton, Olmsted Township, OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 10/847,157

(22) Filed: May 17, 2004

(65) Prior Publication Data

US 2005/0002271 A1 Jan. 6, 2005

Related U.S. Application Data

(60) Provisional application No. 60/471,439, filed on May 16, 2003.

(51) Int. Cl.[7] .......... A47J 43/046
(52) U.S. Cl. .......... 241/282.1; 366/205
(58) Field of Search .......... 241/282.1, 282.2, 241/292.1; 366/205, 343

(56) References Cited

U.S. PATENT DOCUMENTS

| | | | | |
|---|---|---|---|---|
| 2,702,571 | A | 2/1955 | Murray | |
| D181,373 | S | 11/1957 | Schmidt | D7/412 |
| 2,897,862 | A | 8/1959 | Malz et al. | 241/199.12 |
| 3,036,614 | A | 5/1962 | Knapp | 241/292.1 |
| 3,333,831 | A | 8/1967 | Chapman | 366/129 |
| 3,368,800 | A | 2/1968 | William | 241/282.2 |
| 5,599,103 | A | 2/1997 | Linscott | 366/343 |
| 5,647,546 | A | 7/1997 | Sinovas et al. | 241/292.1 |
| 5,655,834 | A | 8/1997 | Dickson | 366/205 |
| D433,282 | S | 11/2000 | Bohannon, Jr. et al. | D7/412 |
| D435,192 | S | 12/2000 | Bohannon, Jr. et al. | D7/413 |
| 6,481,655 | B1 * | 11/2002 | Feigel, Jr. | 241/294 |

* cited by examiner

*Primary Examiner*—David Sorkin
(74) *Attorney, Agent, or Firm*—Renner, Kenner, Greive, Bobak, Taylor & Weber

(57) ABSTRACT

A blade (10) for a blender includes a center portion (11) which includes the axis of rotation. Blade wings (13, 14) extend outwardly from the center portion (11) and wing tips (15, 16) are positioned at the end of the wings (13, 14). The wings (13, 14) and wing tips (15, 16) having leading edges (21, 22) and trailing edges (23, 24). The portion of the leading edges (21, 22) along the wings (13, 14) have beveled edges (13A, 14A) at the bottom surface thereof, and the portion of the leading edges (21, 22) along the wing tips (15, 16) have beveled edges (15A, 16A) formed at the top surfaces thereof. Each of the wings (13, 14) has an effective width to length ratio of greater than 0.287, the length being measured between the axis of rotation and the distal ends of the wing tips (15, 16).

7 Claims, 2 Drawing Sheets

BLENDER BLADE

CROSS-REFERENCE TO RELATED APPLICATION

This application claims the benefit of U.S. Provisional Application No. 60/471,439 filed on May 16, 2003.

TECHNICAL FIELD

The present invention relates generally to blades for blenders, and in particular, providing such blades with efficient configuration. More specifically, the present invention relates blender blades configured to optimize the relationship between the coefficient of drag ($C_D$) and the coefficient of lift ($C_L$). Still more specifically, the present invention relates to blender blades configured to decrease drag by decreasing the amount of impact provided by the wings of the blender blades on a blending medium, but, simultaneously, having dimensions which provide such blender blades with more than adequate lift.

BACKGROUND ART

Blenders have a limited amount of power that can be used to rotate the blades of such blenders in a blending medium. Generally, the blending medium includes both liquids and solids, and the purpose of a blender blade is to homogeneously mix the blending medium provided in a blender pitcher. A blender blade is configured to rotate about an axis of rotation, and normally includes two wings extending in opposite directions from a center portion. The leading edges of the wings are provided with cutting edges, and the wings are oriented at compound angles with respect to the center portion to provide the blender blade with a compound angle of attack.

As the blender blade rotates within the blending medium, the cutting edges define a cutting path, and the wings generate flow of the blending medium. Such flow can be characterized as a vortex which is used to blend the disseparate components of the blending medium together. The flow generated by the wings due to rotation of the blender blade draws the blending medium through the cutting path to homogeneously mix the blending medium, and grind any solids entrained therein using the cutting blades. For example, if the wings are twisted such that the leading edges are vertically oriented above the trailing edges, then rotation of the blender blade repeatedly draws the blending medium (including the solids) through the cutting path. As such, the rotation of the blender blade continuously draws the solids downwardly through the cutting path, and thereafter, pushes the solids upwardly along the interior surfaces of the blender pitcher. Consequently, the blending medium is homogeneously mixed because the solids are continually ground and mixed with remainder of the blending medium through rotation of the blender blade.

Because there is a limited amount of power available from commercial or household electrical receptacles, the efficiency of the blender blades is determined by the blender blades ability to generate flow to homogeneously mix the blending medium using the limited power available.

Oftentimes, the configurations of blender blades have inherent tradeoffs embodied therein. For example, to increase the amount of lift imparted on the blending medium, and increase the ability of a blender blade to draw the blending medium through the cutting path, the wings can be specially configured. As discussed above, the wings are typically oriented at compound angles with respect to the center portion to provide the blender blade with a compound angle of attack. As such, each of the wings is twisted such that its leading edge is vertically oriented above its trailing edge, and angled such that its distal end is vertically oriented above the center portion. Up to a threshold, the greater the angles of the wings, and, most importantly, the twists of the wings, the greater the amount of lift associated with the blender blade.

However, increasing lift produces a tradeoff because a greater amount of viscous resistance is generated when the twists and angles of the wings are increased. For example, a greater amount of blending medium impacts the bottom portions of the wings when the wings are twisted and angled as such. The more viscous resistance generated by impact of the blending medium on the bottom portions of the wings, the more drag which is imparted on the blender blade. Drag decreases the efficiency of the blender blade by decreasing the amount of flow generated thereby given the limited amount of power available. As such, the amount of lift generated by the blender blade is directly related to the amount of drag imparted on the blender blade, and therefore, is directly related to the amount of flow generated.

Consequently, there is a need to configure blender blades to optimize the relationship of lift and drag to efficiently generate flow. Such blender blades should have wings configured to decrease drag by decreasing the amount of impact provided by the wings on a blending medium, but, simultaneously, have dimensions which provide such blender blades with more than adequate lift.

DISCLOSURE OF THE INVENTION

It is thus an object of the present invention to provide a blender blade that is capable of homogeneously mixing a blending medium containing liquids and solids.

It is another object of the present invention to provide a blender blade, as above, which can finely grind solids entrained in the blending medium.

It is still another object of the present invention to provide a blender blade, as above, having an optimized relationship between lift and drag to efficiently generate flow.

It is a further object of the present invention to provide a blender blade, as above, having increased efficiency in generating flow in order to homogeneously mix the blending medium using the limited power available.

These and other objects of the present invention as well as the advantages thereof over existing prior art forms, which will become apparent from the description to follow, are accomplished by the improvements hereinafter described and claimed.

In general, a blender blade made in accordance with the present invention includes a center portion defining the axis of rotation of the blade. Wings extend outwardly from the center portion, and wing tips are positioned on the ends of the wings. The wings and the wing tips include leading edges and trailing edges, where the portion of the leading edges along the wings include beveled edges formed from the bottom surfaces of the wings and the portion of the leading edges along the wing tips include beveled edges formed from the top surfaces of the wing tips.

In accordance with another aspect of the present invention, a blender blade includes a center portion defining the axis of rotation of the blade. Wings extend outwardly from the center portion, and wing tips are positioned on the ends of the wings. Each of the wings has an effective width and a length measured between the axis of rotation and the distal ends of the wing tips, the ratios of the effective widths to the lengths of the wings being greater than 0.287.

A preferred exemplary blender blade made in accordance with the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
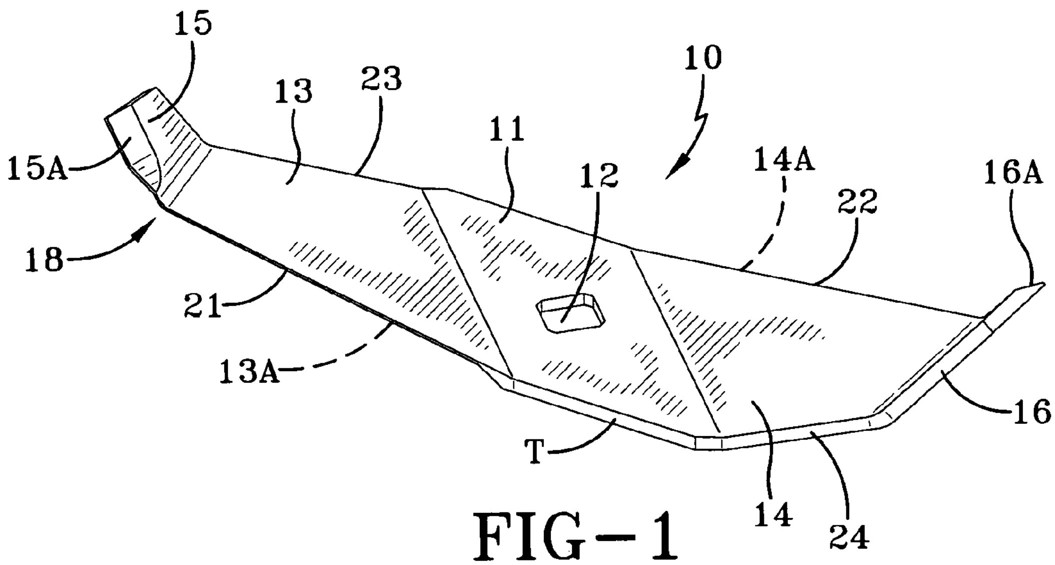
FIG. 1 is a top, left side perspective view of a blade for a blender made in accordance with the present invention.
Figure 2:
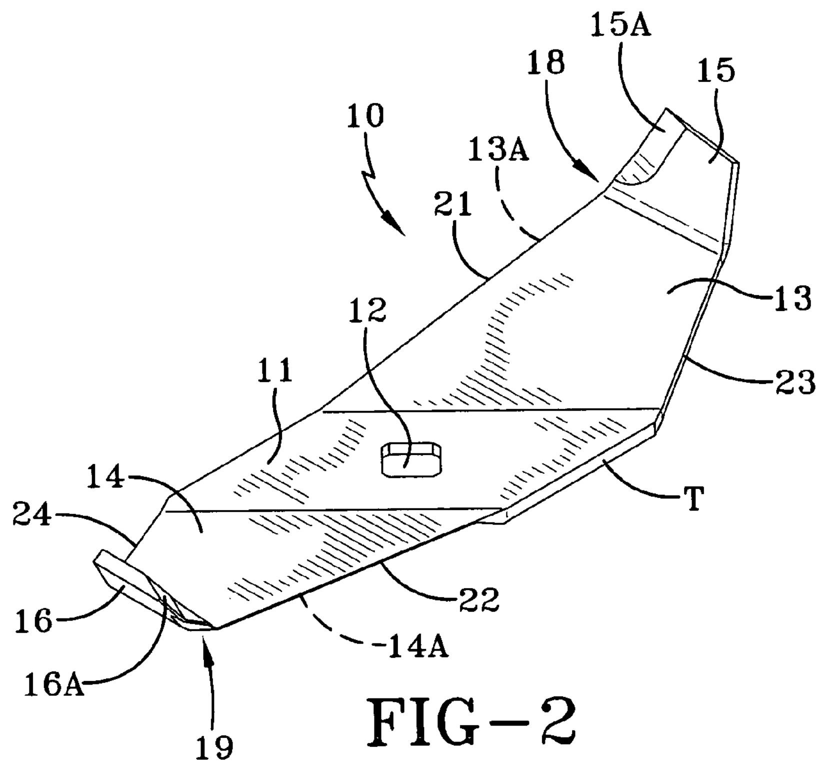
FIG. 2 is a top, left side perspective view thereof taken at a different orientation.
Figure 3:
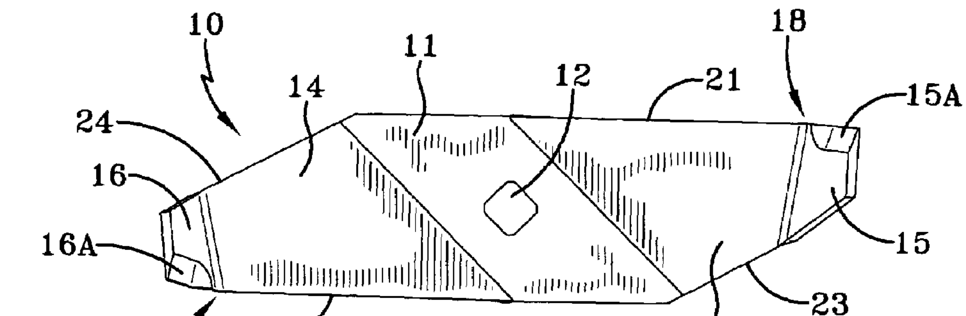
FIG. 3 is a top plan view thereof.

A blender blade made in accordance with the present invention is indicated by the numeral 10 in the accompanying drawings. Blender blade 10 is positioned in the bottom center of a blender pitcher (not shown), and rotates about an axis of rotation during operation. As blender blade 10 rotates, the flow generated by the rotation of blender blade 10 homogeneously mixes a blending medium (containing liquids and solids) added to the blender pitcher. For example, rotation of blending blade 10 generates flow in the form of a vortex. The vortex draws the blending medium through the cutting path of blending blade 10 to homogeneously mix the blending medium, and also finely grind any solids entrained therein.

Blender blade 10 has a center portion 11 which lies in a plane substantially orthogonal to the axis of rotation. Center portion 11 is provided with an aperture 12 used for attaching blender blade 10 to the blender motor. Aperture 12 effectively defines the axis of rotation of blender blade 10.

Extending outwardly at angles from center portion 11 are substantially flat wings 13, 14. Wings 13, 14 are oriented at compound angles with respect to center portion 11, and provide blender blade 10 with a compound angle of attack. As such, wings 13, 14 are twisted such that their respective leading edges 21, 22 are vertically oriented above their respective trailing edges 23, 24, and angled such that their ends are vertically oriented above the center portion 11. Up to a threshold, the greater the angles of wings 13, 14, and, most importantly, the twists of wings 13, 14, the greater the amount of lift associated with blender blade 10.

Attached to the ends of each of wings 13, 14 are wing tips 15, 16, respectively. During operation, the orientation of wing tips 15, 16 with respect to wings 13, 14 creates mini-vortex forces around the periphery of blender blade 10. The mini-vortex forces created by wing tips 15, 16 aid the flow generated by the vortex created by the rotation of blending blade 10 to homogeneously mix the blending medium.

As discussed above, wing 13 and its blade tip 15, and wing 14 and its blade tip 16, are provided with leading edges 21, 22 and trailing edges 23, 24, respectively. Center portion 11, wings 13, 14, and wings 15, 16 have a uniform thickness T. Leading edges 21, 22, however, are sharpened by removing material from thickness T. For example, the portions of leading edges 21, 22 along wings 13, 14 are sharpened by respectively providing beveled edges 13A, 14A. The beveled edges 13A, 14A can be provided on either the top or bottom surfaces of wings 13, 14, but are ideally provided by removing material from the bottom surface of wings 13, 14. Moreover, the portions of leading edges 21, 22 along wing tips 15, 16 are sharpened by respectively providing beveled edges 15A, 16A. The beveled edges 15A, 16A can be provided on either the top or bottom surface of wing tips 15, 16, but are ideally provided by removing material from the top surface of wing tips 15, 16.

Figure 4:
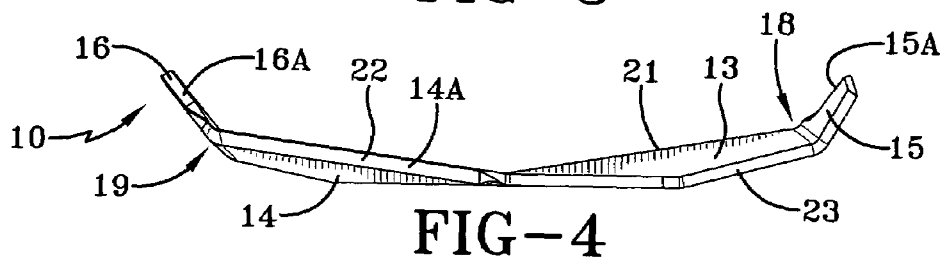
FIG. 4 is a left side elevational view thereof.
Figure 5:
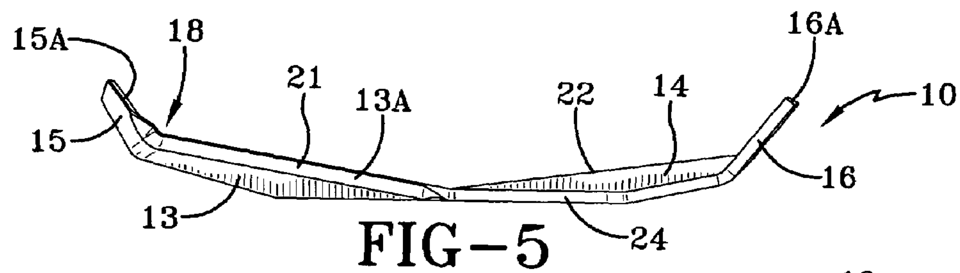
FIG. 5 is a right side elevational view thereof.
Figure 6:
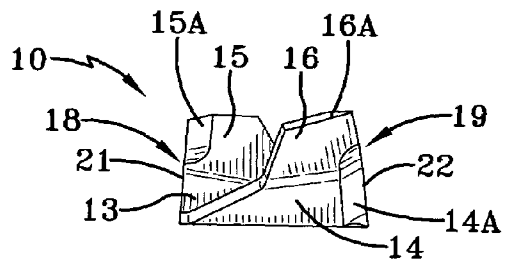
FIG. 6 is a left end elevational view thereof.
Figure 7:
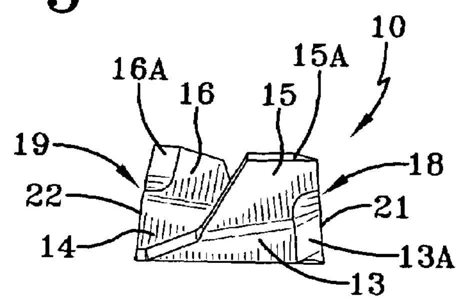
FIG. 7 is a right end elevational view thereof.
Figure 8:
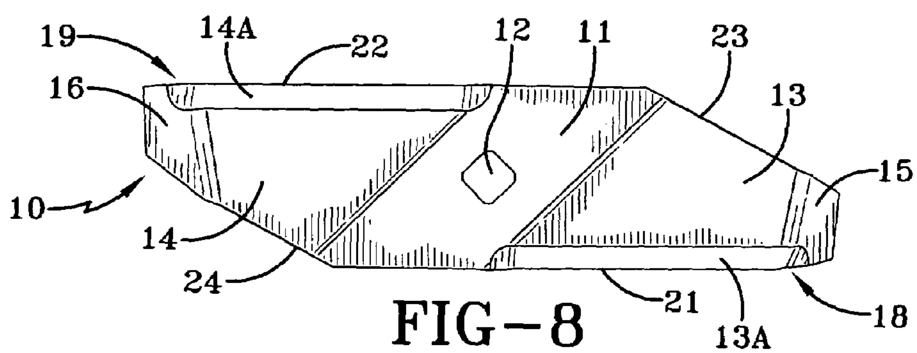
FIG. 8 is a bottom plan view thereof.

As seen in FIGS. 4 and 5, where wings 13, 14 and wing tips 15, 16 are respectively interconnected, transitions 18, 19 are formed respectively between beveled edges 13A, 14A (provided on the bottom surface of wings 13, 14) and beveled edges 15A, 16A (provided on the top surface of wing tips 15, 16). The alternate placement of beveled edges 13A, 14A on the bottom and beveled edges 15A, 16A on the top advantageously increases the grinding capacity of blending blade 10.

As blender blade 10 rotates, leading edges 21, 22 create a substantially conical-shaped cutting path, and define the effective working area of blender blade 10. In the working area, the blending medium is homogeneously mixed, and the solids included in the blending medium are finely ground.

In addition to providing the necessary working area for finely grinding the solids, the above-described configuration can be configured to optimize the relationship between drag and lift generated by the rotation of blender blade 10. Such optimization increases the efficiency of blender blade 10 by advantageously increasing the flow of the blending medium through the working area while simultaneously decreasing the amount of power required to rotate blender blade 10.

Lift is imparted onto the blending medium by blender blade 10 due to the negative pressure above and the positive pressure below the blade generated by blender blade 10 as it rotates. Drag is imparted onto blender blade 10 by the blending medium due to the viscous resistance of the blending medium as blender blade 10 passes therethrough.

The amount of force generated by the drag and lift of a blender blade 10 can be determined using equations well known in fluid dynamics.

$$\text{Drag Force}=C_D\cdot\tfrac{1}{2}\rho V^2A \quad (1)$$

$$\text{Lift Force}=C_L\cdot\tfrac{1}{2}\rho V^2A \quad (2)$$

In Equations (1) and (2), p is the density of the blending medium, V is the velocity of blender blade 10, and A is the combined surface area of wings 13, 14 and wing tips 15, 16. According to Equations (1) and (2), the amount of drag and lift forces generated by blender blade 10 depend upon the coefficient of drag ($C_D$) and coefficient of lift ($C_L$) associated with blender blade 10.

Both coefficients, $C_D$ and $C_L$, are mathematically related, and depend on the configuration of blender blade 10. For example, the coefficient of drag ($C_D$), and therefore, the drag force, depends on the compound angle of attack of wings 13, 14, the sharpness of leading edges 21, 22, and the thickness of wings 13, 14 and wing tips 15, 16. The coefficient of lift ($C_L$), and therefore, the lift force, depends on the compound angle of attack and the combined surface area of wings 13, 14 and wing tips 15, 16.

Wings 13, 14 are provided with low compound angles of attack to decrease drag by decreasing the amount of impact provided by wings 13, 14 on a blending medium. Therefore, rather having the blending medium substantially impacting the bottom surfaces of wings 13, 14 during rotation of the blender blade 10, low compound angles of attack of wings 13, 14 decrease drag by decreasing the amount of such contact. Moreover, low compound angles of attack compel the blending medium to impact leading edges 21, 22, rather than the bottom surfaces of wings 13, 14, which serves to increase the grinding efficiency of blender blade 10.

However, the relationship between the coefficients, $C_D$ and $C_L$, is non-linear, and the coefficients, and hence the forces of drag and lift, can differ by orders of magnitude for when wings 13, 14 of blender blade 10 are configured to have low compound angles of attack. Therefore, adjusting the compound angles of attack of wings 13, 14, and thereafter, relating the forces of drag and lift, is extremely difficult.

Instead, it has proved advantageous to concentrate on maximizing the drag and lift forces for given compound angles of attack of wings 13, 14 by adjusting the dimensions of the combined surface area of wings 13, 14 and wing tips 15, 16. For example, because the coefficient of drag ($C_D$) is not related to the combined surface area of wings 13, 14 and wing tips 15, 16, and should be relatively constant for blender blades 10 having wings 13, 14 with the same compound angles of attack, the relationship between the drag forces of blender blades 10 with different combined surface areas can be easily related. Moreover, the lift force (which is also dependent on the combined surface areas) can be empirically related to the flow rate generated by these different blender blades 10. Therefore, blender blades 10 having different combined surface areas, but having wings 13, 14 with the same compound angles of attack, can be compared to determine the ideal dimensions for blender blade 10 which optimize the relationship between drag and lift.

Through testing, the ideal dimensions of blender blade 10 have been determined. For example, blender blades 10 having differing combined surface areas were provided. The combined surface areas of the different blender blades 10 were related to one another by comparing ratios related to the dimensions of wings 13, 14 of blender blades 10. The ratio compared the effective width ($W_{effective}$) of one of wings 13, 14 to the length of the same one of wings 13, 14 and corresponding one of wing tips 15, 16. The length is determined from the axis of rotation to the distal end of one of wing tips 15, 16, and the effective width ($W_{effective}$) was determined using Equation (3).

$$W_{effective}=A_{WING}/L \tag{3}$$

In Equation (3), the $A_{WING}$ is the surface area of one of wings 13, 14 and the corresponding one of its wing tips 15, 16 combined, and L is the length from the axis of rotation to the distal end of the same one of wing tips 15, 16.

The above-discussed ratio was determined for each of the different blades 10, and the flow rate for a constant speed of rotation generated by each of the different blender blades 10 was measured using a flow meter. From these flow meter measurements and ratios, it was determined that blender blades 10 having dimensions providing a ratio of greater than 0.287 optimized the drag and lift forces. Blender blades 10 having ratios of at least 0.287 provide combined surface areas which provide relatively low drag forces as related to the lift forces empirically associated with the measured flow rates.

As such, wings 13, 14 can be configured to decrease drag by decreasing the amount of impact provided by wings 13,

14 on a blending medium, but, simultaneously, provide such a blender blade 10 with more than adequate lift. As such, blender blades 10 having dimensions providing for a ratio of greater than 0.287, as discussed above, have a relatively low drag force as compared to lift force. Therefore, the drag and lift of the blender blade 10 are optimized to increase the efficiency of blender blade 10 by increasing the amount of flow, and decreasing the amount of power necessary to generate that amount of flow.

Thus, it should be evident that a blade constructed as described herein accomplishes the objects of the invention and substantially improves the art.

What is claimed is:

1. A blade for a blender comprising a center portion defining the axis of rotation of the blade, wings extending outwardly from said center portion, and wing tips positioned on the ends of said wings, said wings and said wing tips including leading edges and trailing edges, wherein the portion of said leading edges along said wings include beveled edges formed at the bottom surfaces of said wings and the portion of said leading edges along said wing tips include beveled edges formed at the top surfaces of said wing tips, and wherein each of said wings has an effective width and a length, the ratios of the effective widths to the lengths of said wings being greater than 0.287, wherein the length is measured between said axis of rotation and the distal ends of said wing tips, and the effective width is the surface area of one of said wings and one of said wing tips divided by the length.

2. A blade for a blender according to claim 1, wherein the ratio of the effective width to the length of a said wing is greater than 0.290.

3. A blade for a blender according to claim 1, wherein each of said wings includes one of said wing tips attached thereto.

4. A blade for a blender according to claim 1, wherein said wings are oriented at compound angles of attack, said wings twisted such that said leading edges are vertically oriented above said trailing edges and angled such that the ends of said wings are vertically oriented above said center portion.

5. A blade for a blender according to claim 4, wherein said leading edges extend from said wings to along said wing tips.

6. A blade for a blender comprising a center portion defining the axis of rotation of the blade, wings extending outwardly from said center portion, wing tips positioned on the ends of said wings, and leading edges and trailing edges provided along said wings and said wing tips, wherein each of said wings have a length and an effective width, the length being measured between said axis of rotation and the distal ends of said wing tips, and the effective width being the surface area of one of said wings and one of said wing tips divided by the length, the ratios of the effective widths to the lengths being greater than 0.287, wherein said wings are oriented at compound angles of attack, and said wings twisted such that said leading edges are vertically oriented above said trailing edges and angled such that the ends of said wings are vertically oriented above said center portion, wherein the portion of said leading edges along said wings include beveled edges formed at the bottom surfaces of said wings, and wherein the portion of said leading edges along said wing tips include beveled edges formed at the top surfaces of said wing tips.

7. A blade for a blender according to claim 6, wherein said beveled edges provided along said wings and said wing tips create a substantially conical-shaped cutting path and define an effective working area for said blade.

* * * * *